(12) United States Patent
Robertson

(10) Patent No.: US 7,870,044 B2
(45) Date of Patent: Jan. 11, 2011

(54) METHODS, SYSTEMS AND COMPUTER PROGRAM PRODUCTS FOR A CLOUD COMPUTING SPOT MARKET PLATFORM

(75) Inventor: James A. Robertson, The Woodlands, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 148 days.

(21) Appl. No.: 12/244,304

(22) Filed: Oct. 2, 2008

(65) Prior Publication Data

US 2010/0088205 A1 Apr. 8, 2010

(51) Int. Cl.
*G07F 19/00* (2006.01)
(52) U.S. Cl. .................. 705/34; 705/1; 705/7; 705/14; 705/26; 705/35; 705/40; 709/202; 709/204; 709/205; 709/206
(58) Field of Classification Search ..................... 705/34
See application file for complete search history.

(56) References Cited

U.S. PATENT DOCUMENTS

2008/0140786 A1* 6/2008 Tran ........................... 709/206
2009/0089078 A1* 4/2009 Bursey ........................... 705/1
2010/0076856 A1* 3/2010 Mullins ....................... 705/26

OTHER PUBLICATIONS

Supply on demand by Ciaran Buckley. Sunday Business Post, Mar. 6, 2005.*

* cited by examiner

*Primary Examiner*—F. Zeender
*Assistant Examiner*—Fawaad Haider

(57) ABSTRACT

This disclosure details the implementation of methods, systems and computer program products for a cloud computing spot market platform (hereinafter, "Platform"). Fluctuations in demand for computing resources may engender idle processing capacity within the framework of a cloud computing system. Embodiments of the Platform provide infrastructure for redistributing idle capacity to grid-style batch computing processes, such as may be based on the same processing resources as those used by the cloud computing system. In this manner, Platform embodiments may increase the utilization of idle resources and reduce revenue losses associated with demand variability for cloud computing system administrators. In one embodiment, market-oriented floating prices for grid-style batch computing utilizing idle resources may be implemented based on monitored and analyzed levels of computing resource supply and demand.

16 Claims, 7 Drawing Sheets

METHODS, SYSTEMS AND COMPUTER PROGRAM PRODUCTS FOR A CLOUD COMPUTING SPOT MARKET PLATFORM

BACKGROUND

Utility computing techniques and services have come about, whereby computing resources are abstracted and made available for lease. By providing real or virtual servers for computational tasks over a communications network, utility computing models may provide users with access to significantly greater computing power than they may otherwise be willing to acquire or be able to afford.

Various utility computing models have been developed, such as grid computing and cloud computing. Grid computing systems comprise networks of loosely coupled computers configured to concertedly perform large and/or computationally intensive tasks. Grid computing techniques have, for example, been applied to problems ranging from seismic analysis to DNA sequencing to economic forecasting. In a cloud computing model, computing resources may be provided within a subscription-based, and/or pay-per-use framework. Often the computing resources in a cloud computing system are provided via simple service-oriented interfaces.

Figure 1:
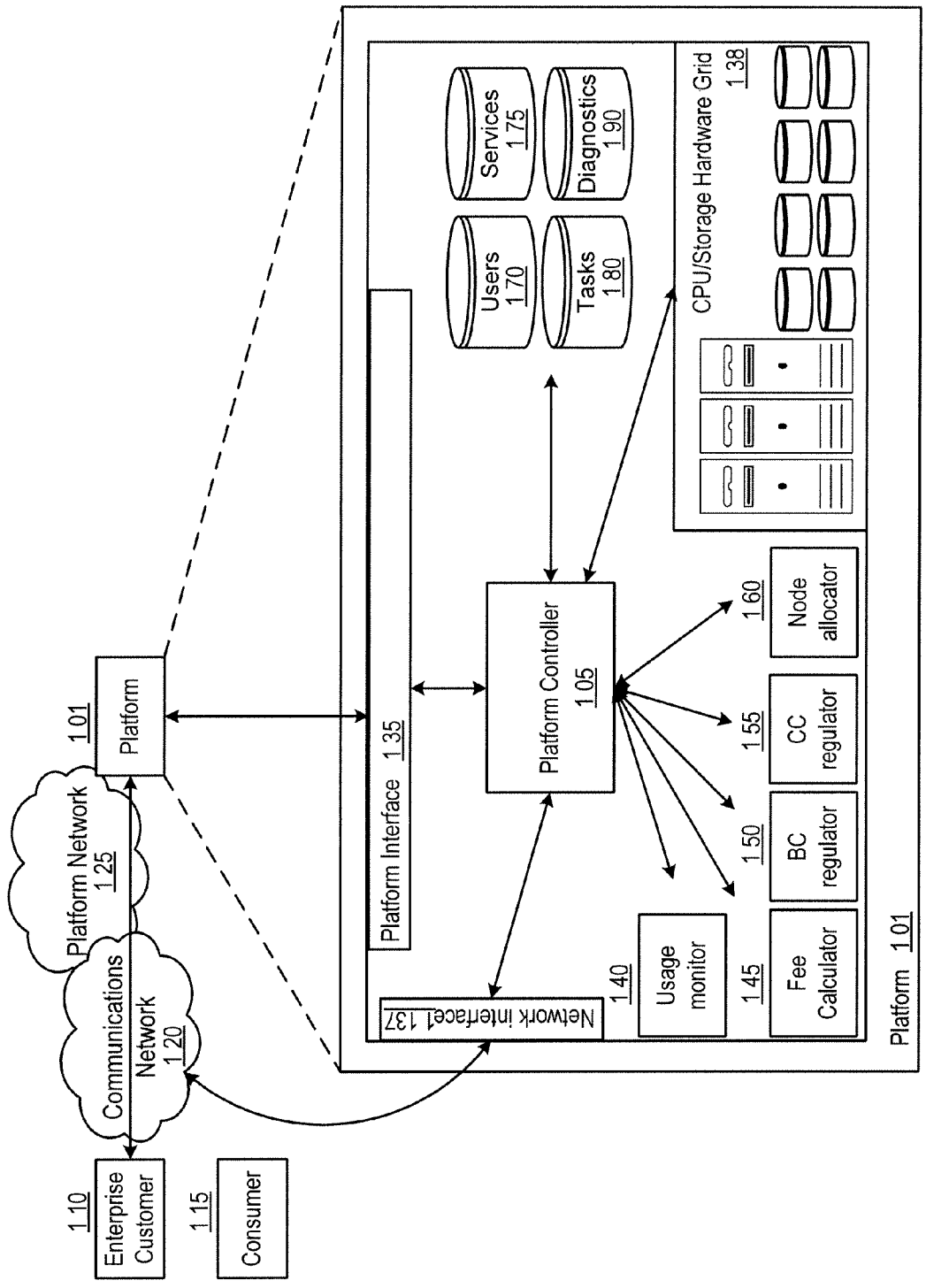
FIG. 1 provides an overview of Platform components and entities that may interact with the Platform at various points during system utilization in one embodiment.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION OF PREFERRED EMBODIMENTS

This disclosure details the implementation of methods, systems and computer program products for a cloud computing spot-market platform (hereinafter, "Platform"). Fluctuations in demand for computing resources may engender idle processing capacity within the framework of a cloud computing system. Embodiments of the Platform provide infrastructure for redistributing idle capacity to grid-style batch computing processes, such as may be based on the same processing resources as those used by the cloud computing system. In this manner, Platform embodiments may increase the utilization of idle resources and reduce revenue losses associated with demand variability for cloud computing system administrators. In one embodiment, market-oriented floating prices for grid-style batch computing utilizing idle resources may be implemented based on monitored and analyzed levels of computing resource supply and demand. In one embodiment, the Platform may allow users to scale up their CPU resource consumption as demand requires, and scale back down as demand decreases; and pay for only the resources they consume. In this embodiment, the user will frequently, have and perhaps even come to expect, a pool of idle resources available to draw upon when demand requires. In one implementation, the Platform and/or Platform administrators may make such resource availability expectations explicit through service-level agreements. Another service-level feature that may exist in an implementation of the Platform is that once the user provisions a compute resource, they can hold onto it essentially indefinitely, for as long as they need it. In one implementation of the Platform, idle resources that arise within an on-demand cloud model can be put to use in a complementary grid computing offering, and this grid offering may, in one implementation, have a lower quality of service. While the Platform's cloud, feature may offer service-level agreements concerning guarantees for availability of idle compute nodes to be drawn upon, the grid "spot market" feature of the Platform may, in one implementation, make no such assurances regarding resource availability at any given time. Furthermore, while the Platform's cloud feature may allow the user who leases a resource to hold onto that resource essentially indefinitely, the Platform's grid feature may make no such assurance. In one implementation, the Platform may, at any time, notify the "spot market" grid task that it should save its work and exit, then after a suitable grace period, the Platform may re-purpose the compute resource for cloud duty to fulfill the user resource demands for the cloud platform. In one implementation, the grid spot market may compensate the user for this lower quality of service (QoS) level regarding resource availability assurance by offering the compute resources at a lower price point than the higher QoS cloud offering.

It is to be understood that, depending on the particular needs and/or characteristics of a Platform user, administrator, computing workload, monetization model, hardware configuration, network framework, and/or the like, various embodiments of the Platform may be implemented that enable a great deal of flexibility and customization. The instant disclosure discusses an embodiment of the Platform primarily within the context of enterprise cloud computing resource management over wide-area communications networks. However, it is to be understood that the system described herein may be readily configured/customized for a wide range of other applications or implementations. For example, aspects of the Platform may be adapted for non-enterprise and/or small scale computing needs, local area network implementations, edge and/or other utility computing frameworks, and/or the like applications. It is to be understood that the Platform may be further adapted to other implementations or computing resource management applications.

FIG. 1 provides an overview of translation platform components and entities that may interact with the translation platform at various points during system utilization in one embodiment. The Platform 101 may contain a number of functional modules and data libraries. In one implementation, the Platform may be subdivided into a plurality of data centers, each equipped and/or configured to implement Platform functionality and/or services. A Platform controller 105 may serve a central role in some embodiments of Platform operation, serving to orchestrate the reception, generation, and distribution of data and/or instructions to, from and between Platform modules and/or mediate communications with external entities and systems. An external user, such as an enterprise customer 110 or individual consumer 115 may access Platform services via a communications network 120 and/or one or more Platform networks 125. A Platform interface 135 may be configured to receive user processing requests and/or instructions, relay Platform messages, receive user application information and/or data, return processing results, and/or the like. The Platform controller 105 may further be coupled to a network interface 137, configured to access one or more communications networks 120, draw remote data, and/or the like.

In one implementation, the Platform controller 105 may further be coupled to a reserve of central processing units (CPUs) and/or storage hardware 138. This reserve may, in one embodiment, serve as computer processing resources available to Platform users within a cloud computing framework and/or for grid-based batch computing tasks. In one implementation, the reserve may comprise a plurality of networked and/or parallel CPUs and storage media configurable to implement on-demand computer processing services over a communications network 120 (e.g., cloud computing) and/or grid-based batch computing of queued and/or pending processing tasks. In one implementation, the reserve's computing resources may be apportioned into a plurality of "nodes" wherein each node may, for example, correspond to a single CPU, collection of CPUs, virtual machine (VM), and/or the like.

In one implementation, the Platform controller 105 may further be coupled to a plurality of modules configured to implement Platform functionality and/or services. A usage monitor 140 may monitor the usage and/or availability of nodes. A fee calculator 145 may determine fees for cloud computing services and/or grid-based batch computing jobs. In one implementation, the fee calculator may receive usage and/or availability information generated by the usage monitor 140 and determine fees, such as for grid-based batch computing jobs, based thereon. A batch computing (BC) regulator 150 may, in one implementation, assess the satisfaction of BC fees, regulate the processing of grid-based BC tasks, manage and/or maintain queues of BC tasks and/or user requirements and requests, determine if and when BC tasks may be terminated or paused, and/or the like. A cloud computing (CC) regulator 155 may, in one implementation, assess the satisfaction of CC fees, regulate the provision of CC services, manage CC processing and user requirements and requests, and/or the like. A node allocator 160 may, in one implementation, assign node statuses (e.g., active, idle, CC, BC, and/or the like), analyze usage and/or availability data, regulate the allocation of nodes to various processing tasks, and/or the like.

In one implementation, the Platform controller 105 may further be coupled to a plurality of databases configured to store and maintain Platform data. A users database 170 may contain user profile information, user processing requests, application data, other user data, and/or the like. A services database 175 may contain data pertaining to Platform service packages, such as service package types (e.g., standard CC, budget CC, high-performance CC, priority BC, and/or the like), fees, computing system descriptions and/or technical specifications, and/or the like. In some implementations, in addition to providing generalized computer processing resources, the Platform may be configured to provide particularized applications and/or services, such as storage services, funds transfer and/or payment agent services, service lookup, geo-spatial services, search and/or sort services, and/or the like. A tasks database 180 may contain data pertaining to pending processing tasks, such as application data, task queues, task descriptions, priorities, and/or the like. A diagnostics database 190 may store usage data, such as demand for computer processing resources, availability of idle nodes, usage trends and/or historical usage, and/or the like.

In one embodiment, the Platform controller 105 may be housed separately from other modules and/or databases within the Platform, while in another embodiment, some or all of the other modules and/or databases may be housed within and/or configured as part of the Platform controller. Further detail regarding implementations of Platform controller operation, modules, and databases is provided below.

Figure 2:
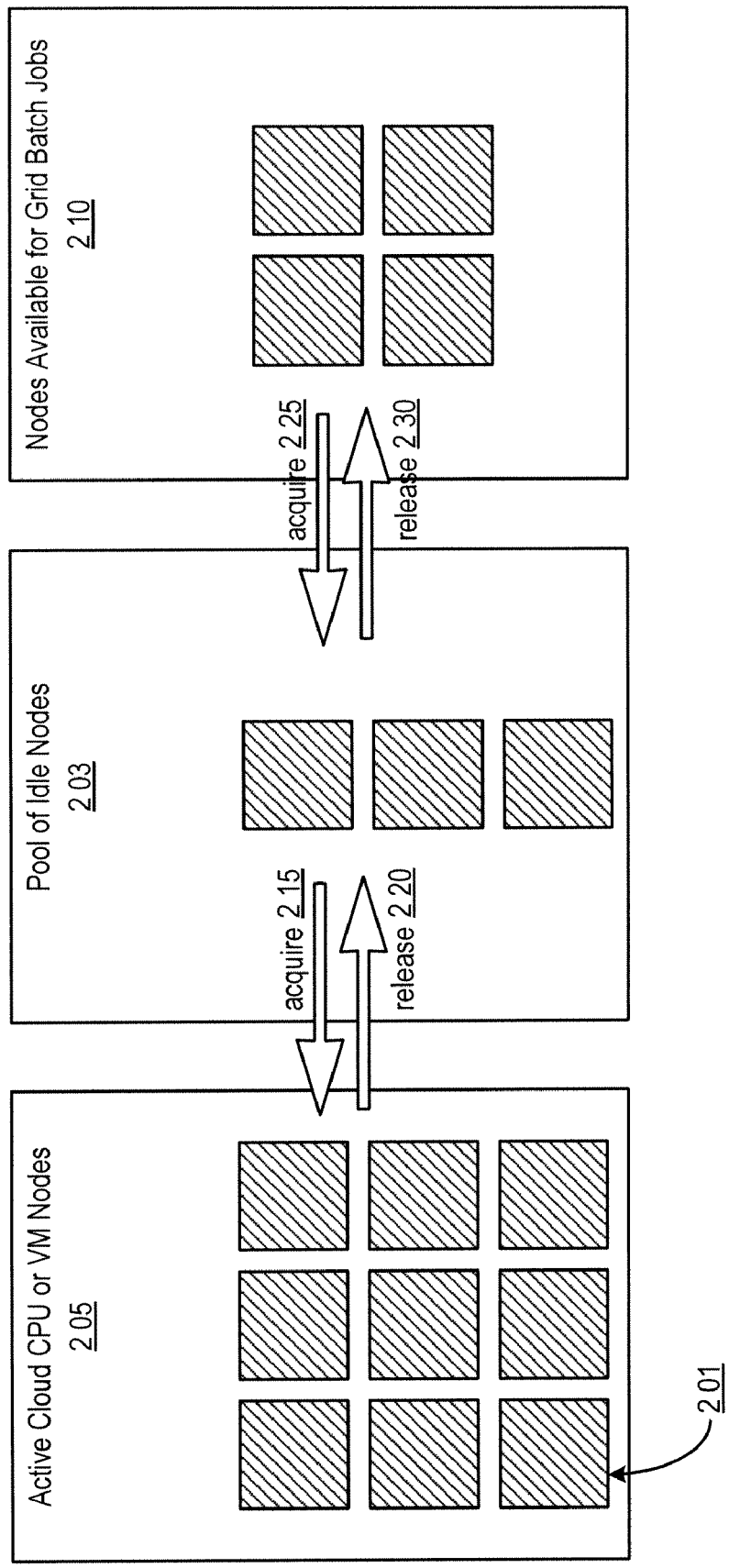
FIG. 2 illustrates an implementation of computing resource allocation in one embodiment of Platform operation.

FIG. 2 illustrates an implementation of computing resource allocation in one embodiment of Platform operation. Platform computing resources may be operationally divided into a plurality of computing nodes 201 which may subsequently be allocated to and/or distributed among various computing groups. Nodes may, for example, comprise individual CPUs, VMs, virtual private or dedicated servers (VPSs or VDSs, respectively), and/or the like. These nodes may be provided to users as on-demand infrastructure within a cloud computing framework, coupled to each other and dedicated to performing grid-based batch computing tasks, and/or the like. In the illustrated implementation, idle nodes are allocated to a pool of idle nodes 203. In one implementation, designation of nodes as idle, active, and/or the like may be based on a query of the nodes' processing load levels. For example, each nodes' current load, average load, peak load, and/or the like as well as current, average, and/or peak CPU usage may be polled and obtained through a system inquiry, such as via a Unix "top" command. In an alternative embodiment, a scheduled load inquiry, chron job, periodic load inquiry, and/or the like can be set to employ the top command, obtain the load averages, and push those to the Platform controller, node allocator, and/or other Platform modules to maintain an active accounting of node loads. It should be noted that granularity for such load inquiries may be varied from a per virtualized CPU basis, up to a per physical CPU basis, up to a per system load inquiry, and/or the like depending on the particular needs and/or requirements of a Platform implementation. In one embodiment, a node may be designated as "idle" when load inquiry reveals that the node is absolutely idle. In an alternative embodiment, a node may be designated as "idle" when a load inquiry reveals that the node's load is less than a threshold value, such as may be specified by Platform administrators. In one implementation, a functional threshold may be specified wherein, for example, the threshold load below which a node is designated as idle may vary depending on time (e.g., a lower threshold during weekends than at the middle of the week), Platform resource demand levels, Platform resource supply levels, and/or other factors and/or parameters. In yet another embodiment, each physical CPU may be apportioned into some fixed number of VM (virtual machine) instances, and the nodes in FIG. 2 may represent the various VM instances existing within the platform. In this embodiment, each VM that is currently not being leased by a user may represent a node in the idle pool; while each VM instance that is currently being leased by a user may represent an active node. In this embodiment, as a user requests that a VM node be provisioned for their use, that node may be logically moved from the pool of idle nodes to the collection of nodes in the active state.

From the pool of idle nodes 203, nodes may be drawn to a class of active cloud computing nodes 205 in order to satisfy user demand for cloud computing resources 215. In one implementation, the Platform may monitor this demand, as well as the available supply of cloud computing resources, in order to determine when to draw nodes into the active cloud computing class, as well as how many nodes to draw at a given time. Nodes may also be released 220 back from the class of active cloud computing nodes 205 to the pool of idle nodes 203 as usage and/or demand for available active cloud computing nodes decreases. In one implementation, a minimum reserve of active cloud computing nodes may be maintained regardless of demand levels, such as in order to accommodate sudden and/or unexpected spikes in demand. In an alternative implementation, such a reserve may be maintained within the pool of idle nodes and drawn into the class of active cloud computing nodes as needed based on demand. In one implementation, the collection of active nodes corresponds exactly with those VM nodes that have been leased and provisioned for use by a user, and nodes are automatically moved from idle to active status when the user provisions the node; while the status changes from active to idle upon the user freeing up the VM node. In one implementation, users may be charged a fee for access to and/or usage of Platform resources allocated to the class of active cloud computing nodes. In one implementation, a fixed price may be charged, such as on a per-node basis, pay-per-use basis, per-hour rental basis, and/or the like. In another implementation, one or more nodes may be collected into computing packages, such as a standard package, a high-speed and/or high-performance package, a budget package, and/or the like, with usage fees depending on which package is selected by a user.

The Platform may also monitor the supply of idle nodes and release available nodes 230 into a class of nodes available for grid batch jobs 210. In this class 210, nodes may be coupled and/or dedicated to the processing of grid-based batch job tasks. In one implementation, grid-based batch jobs may be queued for processing and processed as nodes become available in the grid batch class. In one implementation, the Platform may continuously or periodically monitor demand for active cloud computing resources 205 and acquire resources 225 from the class of nodes available for grid batch jobs 210 back into the pool of idle nodes 203 so that they may be allocated to meet cloud computing resource demand. In one implementation, the Platform may first determine whether grid batch job nodes are at a "termination point", where the current job may be interrupted without unacceptable loss of data, prior to acquiring nodes 225 back to the pool of idle nodes 203 and/or to the class of active cloud computing nodes 205. If a grid batch job is not at a termination point, the Platform may wait until a termination point is reached before acquiring the node for cloud computing usage. In an alternative implementation, the Platform may temporarily allocate other idle nodes to active cloud computing use while waiting for pending grid batch jobs to reach a termination point, even if this means that the pool of idle nodes may temporarily dip below a minimum reserve level. In still another implementation, the Platform may signal one or more grid jobs to save progress and terminate processing at the first possible opportunity. The Platform may assess fees from users in exchange for access to processing by grid batch job nodes 210. In one implementation, these fees may be variable and/or based on levels of grid batch job node supply and/or demand.

In one implementation, a "high-water mark" level may be set for the pool of idle nodes 203, whereby nodes exceeding the high-water mark may be automatically transferred to the nodes available for grid batch jobs 210. When the number of nodes in the pool of idle nodes 203 drops below this high-water mark (or below a somewhat smaller low-water mark), such as when demand for active cloud nodes 205 increases, the Platform may release nodes back to the pool of idle nodes 203 and/or to the class of active cloud computing nodes 205 as needed.

In one implementation, the Platform may only release 230 nodes from the pool of idle nodes 203 to the class of nodes available for grid batch jobs 210 during non-peak demand periods, wherein the demand for active cloud computing nodes 205 is expected to and/or known to be lower than average levels and/or lower than a preset threshold level.

Figure 3:
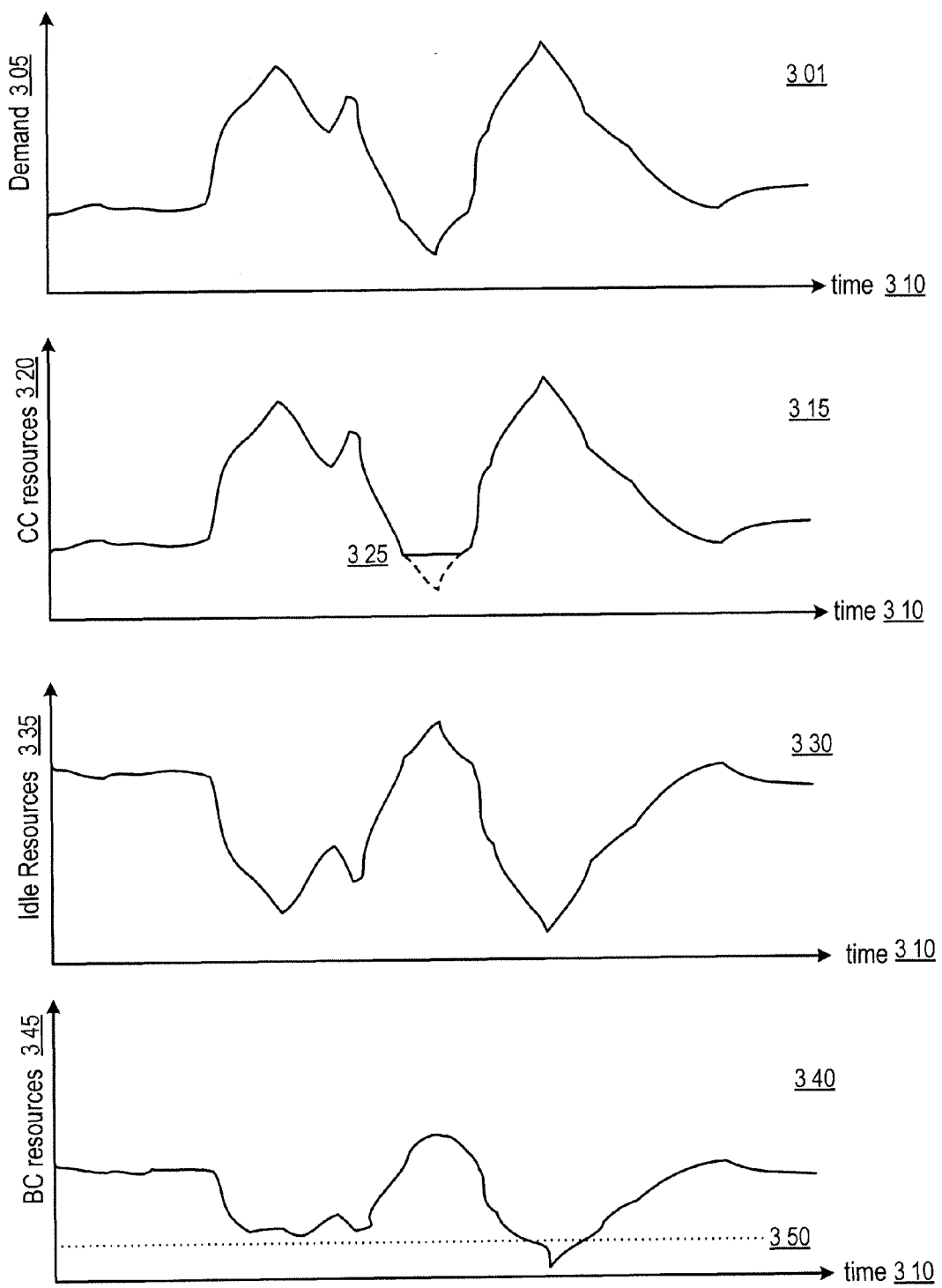
FIG. 3 illustrates resource usage and allocation variability in one embodiment of Platform operation.

FIG. 3 illustrates resource usage and allocation variability in one embodiment of Platform operation. The graph at 301 displays monitored user demand 305 for cloud computing resources as a function of time 310. Large timescale variability of demand is evident, as well as shorter timescale demand fluctuations. In some implementations, demand trends may be modeled and/or predicted, such as by the use of Fourier analysis and/or other data analysis and modeling techniques.

The graph at 315 displays processing CC resources 320 allocated by the Platform to the class of active cloud computing nodes as a function of time 310. In the illustrated implementation, allocated CC resources 320 appear to track the demand 305 for those resources. Shown at 325 is an implementation of a minimum reserve floor that maintains a minimum amount of CC resources 320 despite continued lowering of demand 305. In an alternative implementation, no minimum reserve level exists (i.e., the dotted line at 325). In still another implementation, a minimum reserve level may be maintained in the pool of idle resources rather than in active CC resources. It should be noted that, though the CC resources 320 appear to closely track the demand levels 305, no units are indicated for either the demand axis 305 or the CC resources axis 320, and the actual levels of CC resources allocated may vary from the level of resources demanded. For example, in one implementation, CC resources may be allocated so as to exceed demanded resources by a cushion amount, such as a fixed number of extra nodes, a fixed percentage over demanded resources, a variable amount depending on idle and/or other available resources, and/or the like. In yet another implementation, the Platform may be configured to allocate CC resources 320 so as to track demand 305 with an approximate degree of precision. For example, the Platform may allocate CC resources in order to track only variations in demand with timescales larger than some threshold, with less responsive reactions to short timescale demand spikes or dips. In one implementation, the Platform may be configured to determine a power spectrum of demand variability, such as based on a Fourier analysis, and base CC resource allocation on the most prominent and/or lowest frequency power spectrum features.

It should be noted that, while the Platform my serve to optimize resource utilization within a hybrid cloud/grid utility computing platform, with some given total number of available compute resources, a Platform provider and/or administrator may, in some embodiments, also apply traditional capacity planning and/or grow the total number of compute resources in the Platform over time in order to maintain the service level expectations of the cloud users, as the total Platform usage trends grow over time.

The graph at 335 displays variation of resource levels designated as idle 335 as a function of time 310. In the displayed implementation, the total number of Platform nodes and/or processing resources are approximately constant, so the resources designated as idle 335 approximate the inverse of the CC resources 320, with peaks and troughs in the former corresponding respectively to troughs and peaks in the latter. It should be understood that, in various embodiments and/or implementations, the total number of Platform computing resources and/or the combined CC resources and idle resources may vary over time. Based on the existence of available idle resources 335, the Platform may increase or decrease resources allocated to grid-based batch computing 345, as shown in the graph at 340. In some implementations, BC resources 345 may approximately track the variability of idle resources 335, however differences between the two may arise as a result of a variety of factors, such as the desire to maintain a reserve of idle resources, variations in demand for BC resources, and/or the like. In one implementation, a warning threshold resource level 350 may be set, designating a level of BC resources below which a warning may be provided to users, Platform administrators, and/or the like to save their progress and quit in order to allow BC resources to be reallocated to idle and/or active CC resources.

Figure 4:
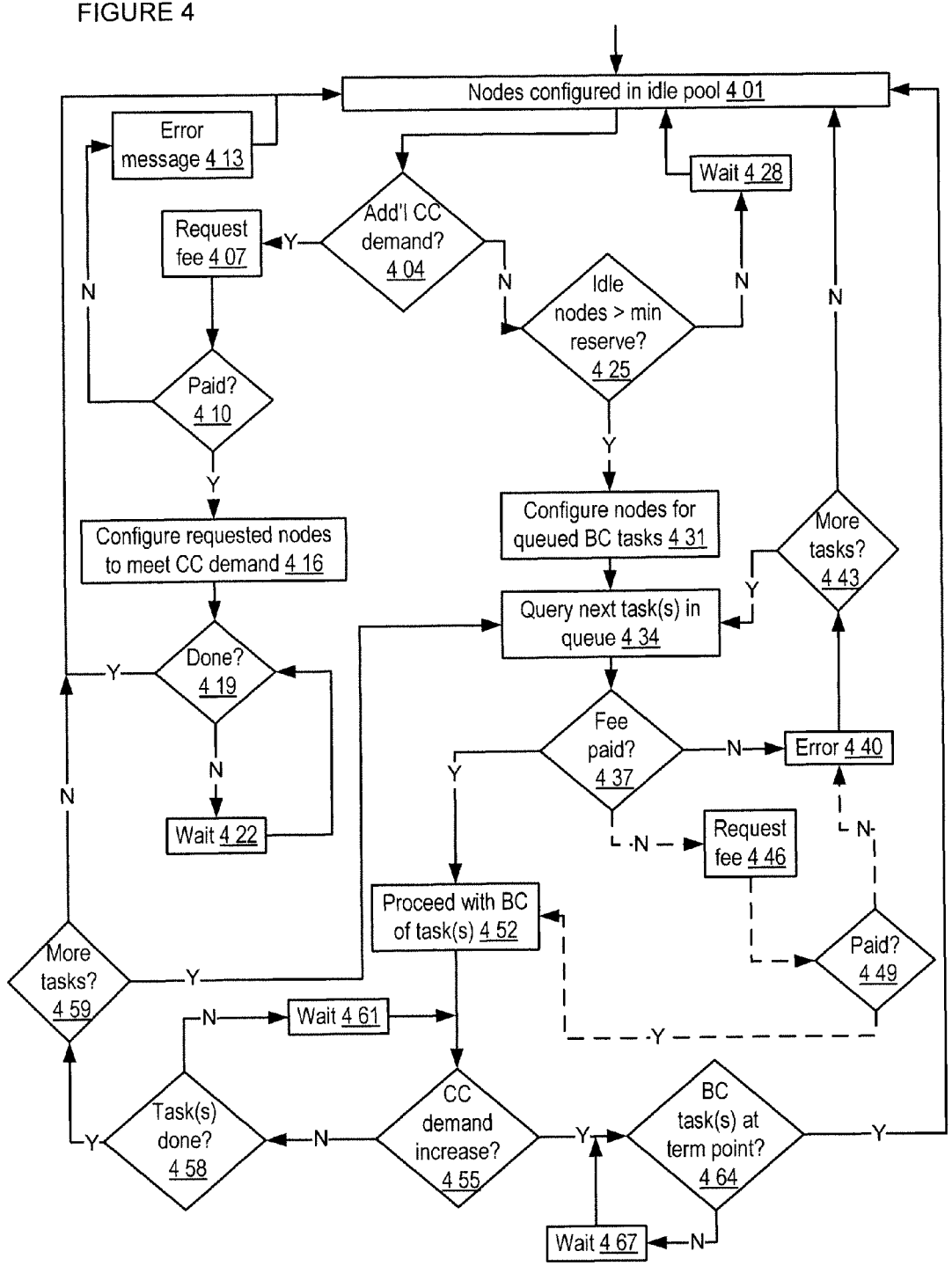
FIG. 4 shows an implementation of logic flow for computing resource analysis and allocation in one embodiment of Platform operation.

FIG. 4 shows an implementation of logic flow for computing resource analysis and allocation in one embodiment of Platform operation. In one implementation, Platform nodes may be initially configured in and/or allocated to the pool of idle resources 401. A determination may then be made as to whether there is additional cloud computing demand 404. In an alternative implementation, this determination may turn not on the existence of demand for cloud computing resources, but instead on whether there is a general desire, such as on the part of Platform administrators, to allocate Platform resources to the active cloud computing pool. If demand exists, then the Platform may request that a fee be paid in exchange for the provision of cloud computing services 407. In one implementation, fees charged for cloud computing resources are fixed with respect to supply and/or demand of available nodes and may further depend on which of a selection of computing packages a user may desire or select (e.g., standard, high-performance, and/or budget computing packages). A determination is made as to whether the fee has been paid 410. If not, then an error message may be supplied to the user notifying them of failure to pay the required fee, and the Platform may return to 401. In an alternative implementation, confirmed payment may not be required until after a given cloud computing service has been delivered. In this case, the Platform may determine whether a payment method has been specified, credit card number supplied, and/or the like before proceeding with the provision of cloud computing services. Once the Platform determines that payment has been rendered, requested nodes may be configured as active CC resources to meet the existing demand 416. A determination may be made as to whether a CC service has been rendered to completion 419. In an alternative implementation, the determination may be regarding whether active CC resources are generally available for reallocation to the pool of idle resources. If not, then the Platform may wait for a period of time 422 and then check the status of the nodes again 419. Once the nodes are available for reallocation to the idle pool, the Platform returns to 401 and configures those nodes accordingly.

If no additional demand for CC resources is determined at 404, a determination may be made as to whether the number of nodes configured in the idle pool exceeds a minimum reserve level of nodes 425. If not, then the Platform may wait 428 and return to 401. Otherwise, the Platform may configure available idle nodes for one or more grid-based batch computing tasks 431. In one implementation, BC tasks may be maintained in a queue and processed based on an order of priority. The Platform may query one or more next task(s) in the queue 434 and determine whether fees have been paid in exchange for processing of the BC task(s) 437. If not, an error message may be supplied to a Platform user, administrator, and/or the like 440, and a determination may be made as to whether there are more BC tasks waiting in the queue 443. If so, then the Platform queries the next task(s) in the queue 434 and proceeds as before. Otherwise, those nodes may be configured for the idle pool 401 to await new CC and/or BC tasks. In an alternative implementation, the Platform may request that an unpaid fee be paid 446. A determination may be made if the request is honored 449 and, if not, then the Platform may return to 440 to check for additional tasks in the queue.

Once the Platform has determined that all necessary fees have been paid, it may proceed with batch computing of the selected task(s) 452. The Platform may continue to monitor demand for CC services and/or periodically determine whether there are any increases in demand 455. If not, then a determination may be made as to whether BC task(s) have been completed 458. If not, then the Platform may wait for a designated period of time 461 before again checking for a CC demand increase 455. Otherwise, a determination may be made as to whether additional BC tasks exist in the queue 459. If so, then the Platform may return to 434 to proceed with querying the next task(s) in the queue. Otherwise, the Platform may return to 401 and release BC nodes back to the pool of idle nodes.

If the determination at 455 resolves an increase in demand for CC resources, then the Platform may determine whether pending BC tasks have reached a termination point, whereat they may be terminated without unacceptable losses of progress and/or data 464. If not, then the Platform my wait for a designated period of time 467 before inquiring again at 464. In one implementation, the Platform may issue a warning for Platform users and/or administrators to save any progress and terminate processing before nodes are released back to the pool of idle nodes and/or reconfigured for active CC processing.

Figure 5:
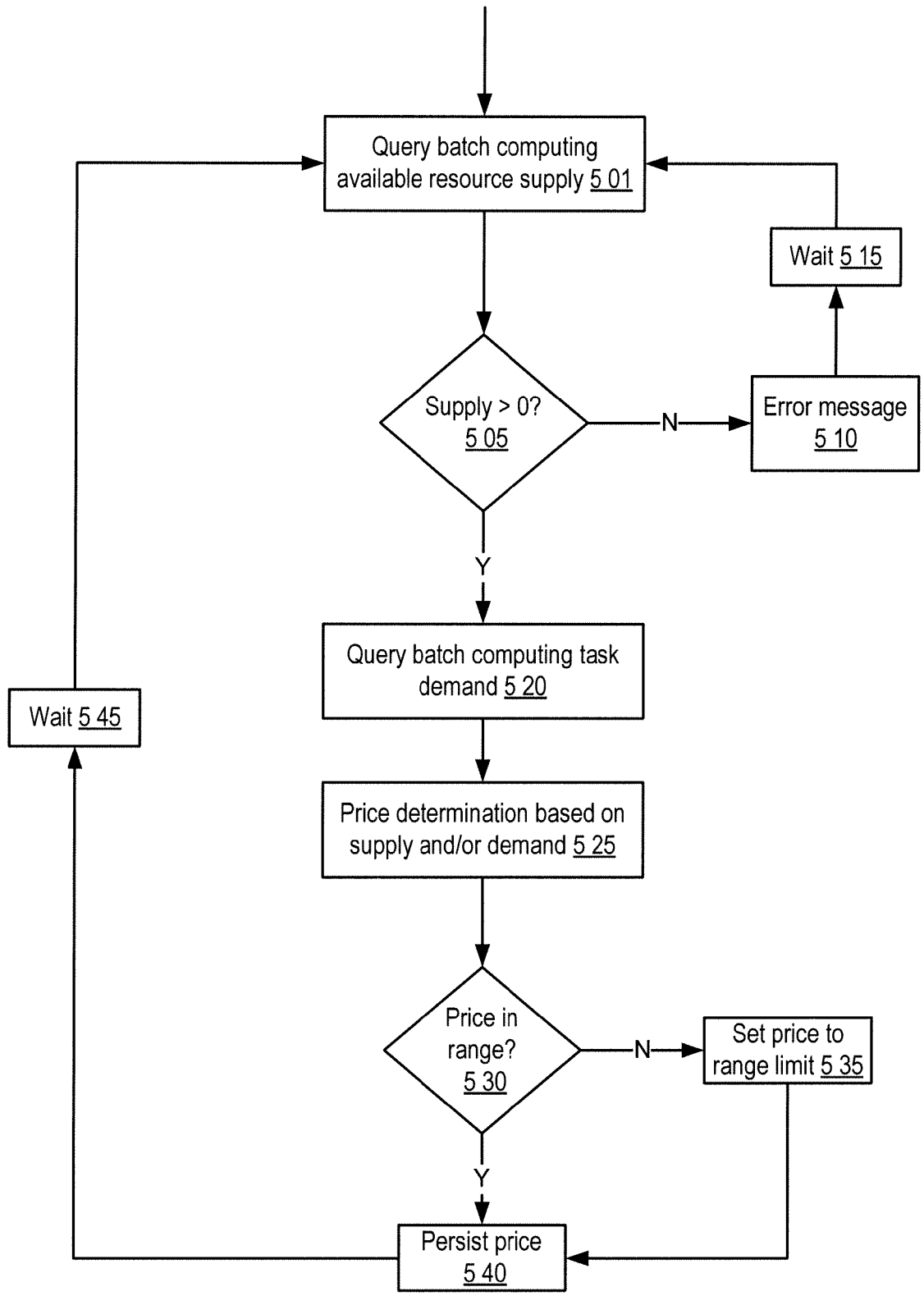
FIG. 5 shows an implementation of logic flow for computing resource usage monitoring and batch computing floating price determination in one embodiment of Platform operation.

FIG. 5 shows an implementation of logic flow for computing resource usage monitoring and batch computing floating price determination in one embodiment of Platform operation. The Platform may begin by querying a level of batch computing resource supply available 501. For example, in one implementation, the Platform may count the number of idle nodes and subtract nodes required to satisfy any existing minimum node reserve requirements in order to calculate the supply of available nodes. A determination is made at 505 as to whether the supply of available BC resources is positive. If not, then an error message may be supplied to a Platform user and/or administrator 510, indicating that no resources are currently available. The Platform may wait for a designated period of time 515 before returning to 501 to begin to attempt a subsequent price determination. If, however, the supply of available BC resources is positive at 505, then the Platform may query existing demand for BC processing 520. For example, BC processing demand may be assessed, in one implementation, by counting the number of pending BC tasks in a queue of tasks. In another implementation, BC processing demand may be determined based on the number of nodes required for tasks in the BC task queue. The Platform may then determine a price and/or fee to charge for BC processing based on the values of supply and demand established at 501 and 520 respectively. A wide variety of different methods may be employed for determining this price within different embodiments of Platform operation (see, e.g., FIGS. 6A-C). A determination may be made at 530 as to whether the determined price falls within a pre-established range of acceptable prices. If not, then the price may be set to the limit of the range closest to the determined value 535. The price is persisted at 540, such as by being saved to a database, for subsequent reference and use in conjunction with and/or in exchange for the provision of BC processing services. Finally, the Platform may wait for a designated period of time 545, before returning to 501 to resample BC resource supply and/or demand and re-determining the price for BC processing services.

Figure 6B:
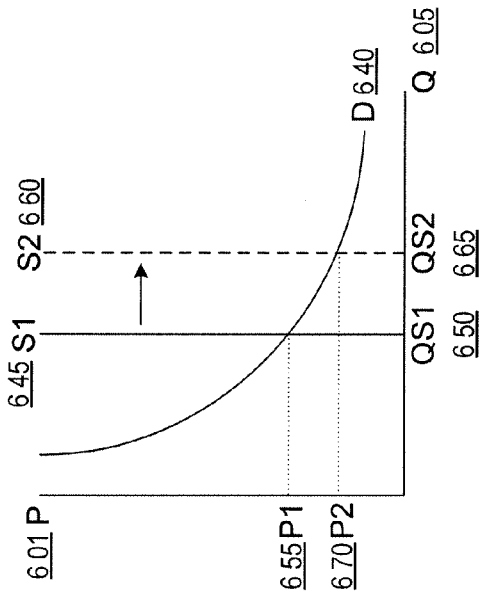
FIGS. 6A-C show implementations of supply and demand based batch computing price determination in some embodiments of Platform operation.
Figure 6A:
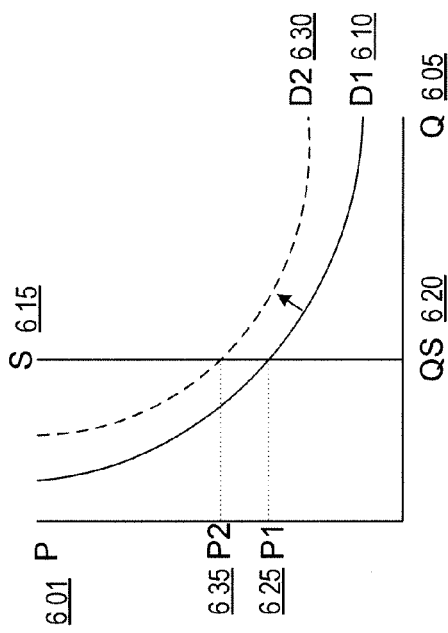
Figure 6C:
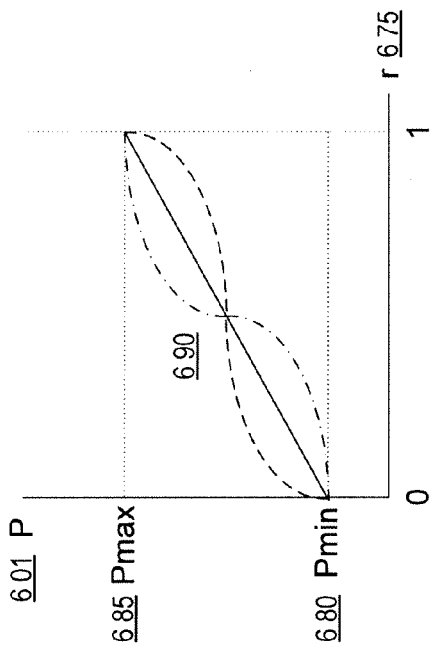

FIGS. 6A-C show implementations of supply and demand based batch computing price determination in some embodiments of Platform operation. FIG. 6A shows price 601 on the vertical axis and quantity 605 on the horizontal axis, with demand (D1) 610 and Supply (S) 615 curves plotted thereon. In the illustrated implementation, the supply curve 615 is shown as being nearly vertical, implying a high price elasticity of supply, and is set to the value QS 620 of available BC nodes. In alternative implementations, any of a wide variety of other supply curves may be employed, implying that greater or fewer nodes may be made available for BC services as the charged price varies. The demand curve 610 may be determined, for example, based on an analysis of historical Platform data accumulated on users, published industry market data, ab initio econometric predictions, and/or the like. The intersection of S 615 and D1 610 yields the equilibrium price P1 625 that may be charged to users of the Platform's BC services. FIG. 6A also illustrates the effect of a shift in demand, such as if there is a sudden increase in the number of users seeking BC services at a given price. The new demand curve D2 630 yields a new equilibrium price P2 635 that is greater than the previous equilibrium price P1 625, reflecting the increased demand for BC services.

In FIG. 6B, the effect of a shift in the supply of available BC resources is illustrated. Here, a demand curve D 640 and an initial supply curve S1 645, which corresponds to a supplied quantity of QS1 650, yields an equilibrium price P1 655. A shift of the supply curve to S2 660 may occur in response to a variety of factors, such as changes in market conditions, variations in the availability of idle nodes, the acquisition of additional computing hardware, and/or the like. The increased supply of nodes (QS2 665) results in a downward shift of the equilibrium price P2 670.

In FIG. 6C, an alternative implementation of BC processing fee determination is illustrated. Here, price P 601 is shown on the vertical axis and a ratio r between the number of demanded idle nodes and the number of active CC nodes and the total number of nodes 675 is shown on the horizontal axis. In the illustrated implementation, the price is set to vary between a minimum price Pmin 680 and a maximum price Pmax 685 as the ratio of active CC nodes to all nodes varies from 0 to 1. At 690 are shown three possibilities for functional forms relating r to P, including a linear variation (solid line), a form favoring steady price near r=0.5 (dashed line), and a form favoring steady prices near r=0 and r=1 (dash-dotted line). It should be recognized that a wide variety of other functional forms may be used within different embodiments and implementations of the Platform. In an alternative implementation, the Platform may query a lookup table relating BC processing fees to values of supply and demand. In other embodiments of the Platform, bidding systems may be implemented and/or integrated with other Platform components to match users to resources within a floating price grid computing framework. In one implementation, user requests for a compute resource may be accompanied by a bid price. User requests may be queued up in a priority queue, ordered by bid price, with highest bid placed at the head of the queue. Requests may be matched with available resources on an on-going basis, in queue priority order.

Platform Controller

Figure 7:
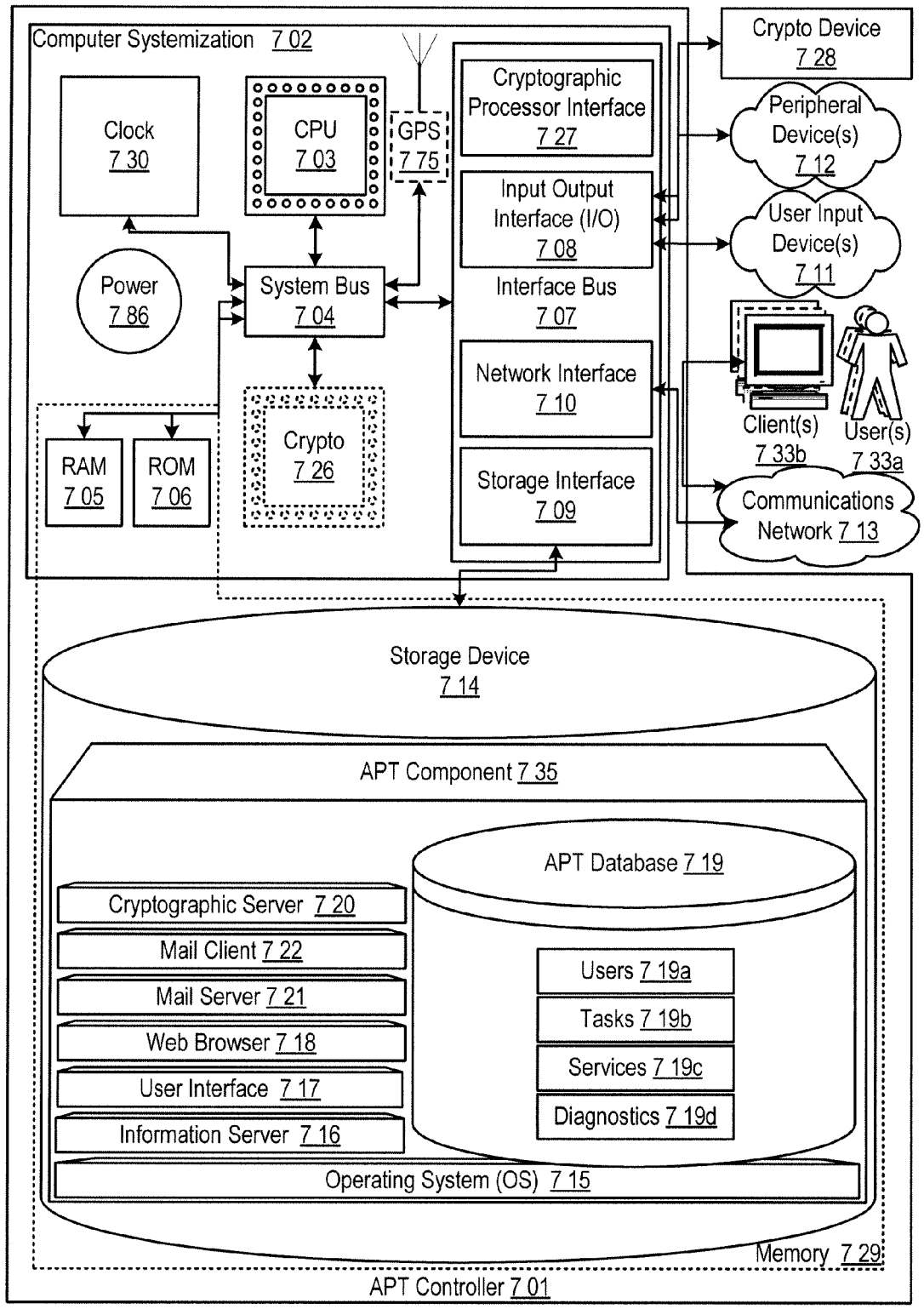
FIG. 7 is of a block diagram illustrating exemplary embodiments of a Manager controller.

FIG. 7 of the present disclosure illustrates inventive aspects of a Platform controller 701 in a block diagram.

Typically, users, which may be people and/or other systems, engage information technology systems (e.g., commonly computers) to facilitate information processing. In turn, computers employ processors to process information; such processors are often referred to as central processing units (CPUs). A common form of processor is referred to as a microprocessor. CPUs use communicative signals to enable various operations. Such communicative signals may be stored and/or transmitted in batches as program and/or data components facilitate desired operations. These stored instruction code signals may engage the CPU circuit components to perform desired operations. A common type of program is a computer operating system, which, commonly, is executed by CPU on a computer; the operating system enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through a database program. Information technology systems provide interfaces that allow users to access and operate various system components.

In one embodiment, the Platform controller 701 may be connected to and/or communicate with entities such as, but not limited to: one or more users from user input devices 711; peripheral devices 712; a cryptographic processor device 728; and/or a communications network 713.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The Platform controller 701 may be based on common computer systems that may comprise, but are not limited to, components such as: a computer systemization 702 connected to memory 729.

Computer Systemization

A computer systemization 702 may comprise a clock 730, central processing unit (CPU) 703, a read only memory (ROM) 706, a random access memory (RAM) 705, and/or an interface bus 707, and most frequently, although not necessarily, the foregoing are all interconnected and/or communicating through a system bus 704. Optionally, the computer systemization may be connected to an internal power source 786. Optionally, a cryptographic processor 726 and/or a global positioning system (GPS) component 775 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. Such signal passing facilitates communication within the Platform controller and beyond through various interfaces. Should processing requirements dictate a greater amount of speed, parallel, mainframe and/or super-computer architectures may similarly be employed. Alternatively, should deployment requirements dictate greater portability, smaller Personal Digital Assistants (PDAs) may be employed.

Power Source

The power source 786 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 786 is connected to at least one of the interconnected subsequent components of the Platform thereby providing an electric current to all subsequent components. In one example, the power source 786 is connected to the system bus component 704. In an alternative embodiment, an outside power source 786 is provided through a connection across the I/O 708 interface. For example, a USB and/or IEEE 1394 connection carries both data and power across the connection and is therefore a suitable source of power.

Interface Adapters

Interface bus(es) 707 may accept, connect, and/or communicate to a number of interface adapters, conventionally although not necessarily in the form of adapter cards, such as, but not limited to: input output interfaces (I/O) 708, storage interfaces 709, network interfaces 710, and/or the like. Optionally, cryptographic processor interfaces 727 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 709 may accept, communicate, and/or connect to a number of storage devices such as, but not limited to: storage devices 714, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 710 may accept, communicate, and/or connect to a communications network 713. Through a communications network 713, the Platform controller is accessible through remote clients 733*b* (e.g., computers with web browsers) by users 733*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 710 may be used to engage with various communications network types 713. For example, multiple network interfaces may be employed to allow for the communication over broadcast, multicast, and/or unicast networks.

Input Output interfaces (I/O) 708 may accept, communicate, and/or connect to user input devices 711, peripheral devices 712, cryptographic processor devices 728, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 711 may be card readers, dongles, finger print readers, gloves, graphics tablets, joysticks, keyboards, mouse (mice), remote controls, retina readers, trackballs, trackpads, and/or the like.

Peripheral devices 712 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the Platform controller may be embodied as an embedded, dedicated, and/or monitor-less (i.e., headless) device, wherein access would be provided over a network interface connection.

Cryptographic units such as, but not limited to, microcontrollers, processors 726, interfaces 727, and/or devices 728 may be attached, and/or communicate with the Platform controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allow for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 729. However, memory is a fungible technology and resource; thus, any number of memory embodiments may be employed in lieu of or in concert with one another. It is to be understood that the Platform controller and/or a computer systemization may employ various forms of memory 729. For example, a computer systemization may be configured wherein the functionality of on-chip CPU memory (e.g., registers), RAM, ROM, and any other storage devices are provided by a paper punch tape or paper punch card mechanism; of course, such an embodiment would result in an extremely slow rate of operation. In a typical configuration, memory 729 will include ROM 706, RAM 705, and a storage device 714. A storage device 714 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); an array of devices (e.g., Redundant Array of Independent Disks (RAID)); and/or other devices of the like. Thus, a computer systemization generally requires and makes use of memory.

Component Collection

The memory 729 may contain a collection of program and/or database components and/or data such as, but not limited to: operating system component(s) 715 (operating system); information server component(s) 716 (information server); user interface component(s) 717 (user interface); Web browser component(s) 718 (Web browser); database(s) 719; mail server component(s) 721; mail client component(s) 722; cryptographic server component(s) 720 (cryptographic server); the Platform component(s) 735; and/or the like (i.e., collectively a component collection). These components may be stored and accessed from the storage devices and/or from storage devices accessible through an interface bus. Although non-conventional program components such as those in the component collection, typically, are stored in a local storage device 714, they may also be loaded and/or stored in memory such as: peripheral devices, RAM, remote storage facilities through a communications network, ROM, various forms of memory, and/or the like.

Operating System

The operating system component 715 is an executable program component facilitating the operation of the Platform controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the Platform controller to communicate with other entities through a communications network 713. Various communication protocols may be used by the Platform controller as a subcarrier transport mechanism for interaction, such as, but not limited to: multicast, TCP/IP, UDP, unicast, and/or the like.

Information Server

An information server component 716 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, Java, JavaScript, Practical Extraction Report Language (PERL), Hypertext Pre-Processor (PHP), pipes, Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the Platform controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the Platform database 719, operating systems, other program components, user interfaces, Web browsers, and/or the like.

Access to the Platform database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the Platform. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the Platform as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/Vista (i.e., Aero)/XP, or Unix's X-Windows (e.g., which may include additional Unix graphic interface libraries and layers such as K Desktop Environment (KDE), mythTV and GNU Network Object Model Environment (GNOME)), provide a baseline and means of accessing and displaying information graphically to users.

A user interface component 717 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact with, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 718 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program components through facilities such as Java, JavaScript, ActiveX, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the Platform enabled nodes. The combined application may be nugatory on systems employing standard Web browsers.

Mail Server

A mail server component 721 is a stored program component that is executed by a CPU 703. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the Platform.

Access to the Platform mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 722 is a stored program component that is executed by a CPU 703. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 720 is a stored program component that is executed by a CPU 703, cryptographic processor 726, cryptographic processor interface 727, cryptographic processor device 728, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the Platform may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the Platform component to engage in secure transactions if so desired. The cryptographic component facilitates the secure accessing of resources on the Platform and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Platform Database

The Platform database component 719 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the Platform database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data, but may have other types of functionality encapsulated within a given object. If the Platform database is implemented as a data-structure, the use of the Platform database 719 may be integrated into another component such as the Platform component 735. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 719 includes several tables 719*a-d*. A Users table 719*a* may include fields such as, but not limited to: user_ID, password, company_name, liaison_name, contact_info, IP_address, access_level, usage_restrictions, payment_info, usage_history, task_ID, and/or the like. A Tasks table 719*b* may include fields such as, but not limited to: task_ID, task_name, user_ID, description, system_requirements, priority, termination_point_benchmarks, restrictions, saved_data, application_data, and/or the like. A Services table 719*c* may include fields such as, but not limited to: service_ID, service_name, fee(s), fee_formula, diagnostics_ID, service_package, node_allocations, and/or the like. A Diagnostics table 719c may include fields such as, but not limited to: diagnostics_ID, node_supply, node_demand, service_ID, and/or the like. These tables may support and/or track multiple entity accounts on the Platform controller.

In one embodiment, the Platform database may interact with other database systems. For example, employing a distributed database system, queries and data access by search Platform component may treat the combination of the Platform database, an integrated data security layer database as a single database entity.

In one embodiment, user programs may contain various user interface primitives, which may serve to update the Platform. Also, various accounts may require custom database tables depending upon the environments and the types of clients the Platform may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 719a-d. The Platform may be configured to keep track of various settings, inputs, and parameters via database controllers.

The Platform database may communicate to and/or with other components in a component collection, including itself, and/or facilities of the like. Most frequently; the Platform database communicates with the Platform component, other program components, and/or the like. The database may contain, retain, and provide information regarding other nodes and data.

The Platform Component

The Platform component 735 is a stored program component that is executed by a CPU. In one embodiment, the Platform component incorporates any and/or all combinations of the aspects of the Platform that was discussed in the previous figures. As such, the Platform affects accessing, obtaining and the provision of information, services, transactions, and/or the like across various communications networks.

The Platform component is configurable to access, calculate, engage, exchange, generate, identify, instruct, match, process, search, serve, store, and/or facilitate allocation of computer processing resources between and among one or more cloud computing frameworks, grid based batch computing frameworks, and/or the like, monitoring and analysis of computing resources supply and/or demand, determination of fees, and/or the like and use of the Platform.

The Platform component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, WebObjects, and/or the like. In one embodiment, the Platform server employs a cryptographic server to encrypt and decrypt communications. The Platform component may communicate to and/or with other components in a component collection, including itself, and/or facilities of the like. Most frequently, the Platform component communicates with the Platform database, operating systems, other program components, and/or the like. The Platform may contain, communicate, generate, obtain, and/or provide program component, system, user, and/or data communications, requests, and/or responses.

Distributed Platforms

The structure and/or operation of any of the Platform node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the Platform controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A method, comprising:
   requesting payment of a first fee for access to cloud computing resources, wherein the first fee is a fixed fee;
   providing access to cloud computing resources via a communications network if the first fee is paid;
   monitoring computing resource usage levels for the cloud computing resources by determining computing resource demand and available computing resource supply;
   determining a grid-based batch computing price based on the monitored computing resource usage levels;
   requesting payment of a fee for grid-based batch computing service, wherein the fee is based on the grid-based batch computing price;
   providing idle cloud computing resources for grid-based batch computing service if the fee is paid;
   allocating the idle cloud computing resources for grid-based batch computing service based on the determined available computing resource supply when an idle cloud computing resources level exceeds a first threshold level;
   determining if at least one grid-based batch computing task is at a termination point;
   waiting for the at least one grid-based batch computing task to reach a termination point if the termination point has not yet been reached;
   de-allocating computing resources from grid-based batch computing when the at least one grid-based batch computing task is at a termination point; and
   wherein cloud computing resources are de-allocated from grid-based batch computing when the idle cloud computing resources level falls below a second threshold level that is no greater than the first threshold level.

2. The method of claim 1, further comprising:
   performing a load level inquiry for cloud computing resources to determine associated load levels; and
   designating cloud computing resources as idle cloud computing resources if associated load levels are less than a threshold value.

3. The method of claim 2, wherein the threshold value comprises a parameter-dependent functional threshold.

4. The method of claim 2, wherein the load level inquiry is performed on a scheduled basis.

5. The method of claim 1, wherein the determining a grid-based batch computing price is performed periodically.

6. The method of claim 1, wherein the allocating idle cloud computing resources only takes place during off-peak demand periods, wherein the off-peak demand periods correspond to low demand for access to cloud computing resources.

7. The method of claim 1, wherein the allocating idle cloud computing resources for grid-based batch computing service is further based on computing resource demand.

8. The method of claim 1, wherein allocating idle cloud computing resources for grid-based batch computing service is restricted by a pre-set minimum resource reserve requirement for the cloud computing resources.

9. The method of claim 1, further comprising:
   requesting that a user save grid-based batch computing progress and terminate the at least one grid-based batch computing task before de-allocating computing resources from grid-based batch computing.

10. The method of claim 1, wherein computing resources are apportioned as nodes.

11. The method of claim 10, wherein each node corresponds to a central processing unit.

12. The method of claim 10, wherein each node corresponds to a virtual machine.

13. The method of claim 1, wherein the grid-based batch computing service is applied to a task selected from a queue of tasks.

14. A system, comprising:
   a processor;
   a memory in communication with the processor and containing program instructions;
   an input and output in communication with the processor and memory comprising a graphical interface;
   wherein the processor executes program instructions contained in the memory and the program instructions comprise:

request payment of a first fee for access to cloud computing resources, wherein the first fee is a fixed fee;
provide access to cloud computing resources via a communications network;
monitor computing resource usage levels for the cloud computing resources by determining computing resource demand and available computing resource supply;
determine a grid-based batch computing price based on the monitored computing resource usage levels;
request payment of a fee for grid-based batch computing service, wherein the fee is based on the grid-based batch computing price;
provide idle cloud computing resources for grid-based batch computing service if the fee is paid;
allocate the idle cloud computing resources for grid-based batch computing service based on the determined available computing resource supply when an idle cloud computing resource level exceeds a first threshold level;
determine if at least one grid-based batch computing task is at a termination point;
wait for the at least one grid-based batch computing task to reach a termination point if the termination point has not yet been reached;
de-allocate computing resources from grid-based batch computing when the at least one grid-based batch computing task is at a termination point; and
wherein cloud computing resources are de-allocated from grid-based batch computing when the idle cloud computing resources level falls below a second threshold level that is no greater than the first threshold level.

15. A computer program product, comprising:
processor readable instructions stored in the computer program product, wherein the processor readable instructions are issuable by a processor to:
request payment of a first fee for access to cloud computing resources, wherein the first fee is a fixed fee;
provide access to cloud computing resources via a communications network;
monitor computing resource usage levels for the cloud computing resources by determining computing resource demand and available computing resource supply;
determine a grid-based batch computing price based on the monitored computing resource usage levels;
request payment of a fee for grid-based batch computing service, wherein the fee is based on the grid-based batch computing price;
provide idle cloud computing resources for grid-based batch computing service if the fee is paid;
allocate the idle cloud computing resources for grid-based batch computing service based on the determined available computing resource supply when an idle cloud computing resource level exceeds a first threshold level;
determine if at least one grid-based batch computing task is at a termination point;
wait for the at least one grid-based batch computing task to reach a termination point if the termination point has not yet been reached;
de-allocate computing resources from grid-based batch computing when the at least one grid-based batch computing task is at a termination point; and
wherein cloud computing resources are de-allocated from grid-based batch computing when the idle cloud computing resources level falls below a second threshold level that is no greater than the first threshold level.

16. A method, comprising:
requesting payment of a first fee for access to cloud computing resources, wherein the first fee is a fixed fee;
providing access to cloud computing resources via a communications network if the first fee is paid;
monitoring computing resource usage levels for the cloud computing resources by determining computing resource demand and available computing resource supply;
determining a grid-based batch computing price based on the monitored computing resource usage levels;
requesting payment of a fee for grid-based batch computing service, wherein the fee is based on the grid-based batch computing price;
providing idle cloud computing resources for grid-based batch computing service if the fee is paid;
allocating the idle cloud computing resources for grid-based batch computing service based on the determined available computing resource supply when an idle cloud computing resources level exceeds a first threshold level; and
requesting that a user save grid-based batch computing progress and terminate the at least one grid-based batch computing task before de-allocating computing resources from grid-based batch computing,
wherein cloud computing resources are de-allocated from grid-based batch computing when the idle cloud computing resources level falls below a second threshold level that is no greater than the first threshold level.

* * * * *